US012732350B2

(12) United States Patent
Huttner

(10) Patent No.: US 12,732,350 B2
(45) Date of Patent: Sep. 8, 2026

(54) QUANTUM KEY DISTRIBUTION NETWORK AND QUANTUM-SECURED COMMUNICATION NETWORK INCLUDING THE ABOVE

(71) Applicant: ID QUANTIQUE SA, Carouge (CH)

(72) Inventor: Bruno Huttner, Chavannes-près-Renens (CH)

(73) Assignee: ID QUANTIQUE SA, Geneva (CH)

( * ) Notice: Subject to any disclaimer, the term of this patent is extended or adjusted under 35 U.S.C. 154(b) by 46 days.

(21) Appl. No.: 18/834,050

(22) PCT Filed: Jan. 26, 2023

(86) PCT No.: PCT/EP2023/051921
§ 371 (c)(1),
(2) Date: Jul. 29, 2024

(87) PCT Pub. No.: WO2023/148079
PCT Pub. Date: Aug. 10, 2023

(65) Prior Publication Data

US 2025/0141667 A1 May 1, 2025

(30) Foreign Application Priority Data

Feb. 2, 2022 (EP) .................................... 22154719

(51) Int. Cl.
*H04L 9/08* (2006.01)
*H04L 9/40* (2022.01)

(52) U.S. Cl.
CPC ........ *H04L 9/0852* (2013.01); *H04L 63/0442* (2013.01)

(58) Field of Classification Search
CPC .......................... H04L 9/0852; H04L 63/0442
USPC ......................................................... 380/278
See application file for complete search history.

(56) References Cited

U.S. PATENT DOCUMENTS

2005/0063547 A1* 3/2005 Berzanskis ........... H04L 9/0852 380/278
2013/0083926 A1* 4/2013 Hughes ................. H04L 9/3247 380/278
2022/0321333 A1* 10/2022 Wissel .................. H04L 9/0855

FOREIGN PATENT DOCUMENTS

CN 206135936 U * 4/2017
CN 108462573 A * 8/2018 ........... H04L 9/0855
CN 108768629 A * 11/2018 ........... H04L 9/0855
CN 111262699 A * 6/2020 ........... H04L 9/0869

(Continued)

OTHER PUBLICATIONS

Lord et al., "London Quantum-Secured Metro Network," 2023 Optical Fiber Communications Conference and Exhibition (OFC), San Diego, CA, USA, 2023, pp. 1-4, doi: 10.1364/OFC.2023.W4K.4. (Year: 2023).*

(Continued)

*Primary Examiner* — Peter C Shaw
(74) *Attorney, Agent, or Firm* — Dinsmore & Shohl LLP

(57) ABSTRACT

The present invention relates to a Quantum Key Distribution Network comprising a Quantum Key Distribution layer comprising a plurality of pairs of emitters and receivers and a plurality of Core Nodes and Edge Nodes and a Key Management Layer adapted to exclusively receive XORed-keys from the Core Nodes, mix said XORed-keys from the Core Nodes, and send said mixed XORed-keys to the Edge Nodes of the QKD layer, in order to generate a shared key between said Edge Nodes.

20 Claims, 5 Drawing Sheets

(56) References Cited

FOREIGN PATENT DOCUMENTS

| | | | | |
|---|---|---|---|---|
| WO | WO-2018082345 A1 * | 5/2018 | ........... | H04L 9/0855 |
| WO | WO-2019128753 A1 * | 7/2019 | ............... | H04L 9/08 |
| WO | WO-2019128785 A1 * | 7/2019 | ............... | H04L 9/08 |
| WO | WO-2020216338 A1 * | 10/2020 | ......... | H04L 63/0435 |
| WO | WO-2020221085 A1 * | 11/2020 | ........... | H04L 9/0855 |

OTHER PUBLICATIONS

Vyas et al., "Relaxing Trust Assumptions on Quantum Key Distribution Networks," 2025 Joint European Conference on Networks and Communications & 6G Summit (EuCNC/6G Summit), Poznan, Poland, 2025, pp. 709-714, doi: 10.1109/EuCNC/6GSummit63408.2025.11037207. (Year: 2025).*

Nieto-Chaupis, "QoS evaluation for end user mobility for accessing classical and QKD networks," 2014 IEEE Latin-America Conference on Communications (LATINCOM), Cartagena, Colombia, 2014, pp. 1-4, doi: 10.1109/LATINCOM.2014.7041881. (Year: 2014).*

Lemons et al., "Extending quantum key distribution through proxy re-encryption," in Journal of Optical Communications and Networking, vol. 15, No. 7, pp. 457-465, Jul. 2023, doi: 10.1364/JOCN.474487. (Year: 2023).*

Huttner, "Secure Architecture for Quantum Key Distribution Networks," 2024 Optical Fiber Communications Conference and Exhibition (OFC), San Diego, CA, USA, 2024, pp. 1-3. (Year: 2024).*

Dai et al., "Multi-Scenario Quantum Key Distribution Mechanism for Power Grid Terminals," 2024 12th International Conference on Information Systems and Computing Technology (ISCTech), Xi'an, China, 2024, pp. 1-5, doi: 10.1109/ISCTech63666.2024.10845578. (Year: 2024).*

Tian et al., "High-Speed Privacy Amplification Algorithm Based on Two-Dimensional Cellular Automata in Quantum Key Distribution," in IEEE Photonics Journal, vol. 18, No. 1, pp. 1-12, Feb. 2026, Art No. 7600112, doi: 10.1109/JPHOT.2025.3638669. (Year: 2025).*

Xu et al., "Security Storage Based on Fountain Code and XOR Encryption in Edge Computing," 2019 Twelfth International Conference on Ubi-Media Computing (Ubi-Media), Bali, Indonesia, 2019, pp. 7-11, doi: 10.1109/Ubi-Media.2019.00011. (Year: 2019).*

Dianati, M., et al., "Architecture of the Secoqc Quantum Key Distribution network", arXiv:quant-ph/0610202v2, Year 2006, pp. 1-18.

Mehic, M., et al., "Quantum Key Distribution: A Networking Perspective", ACM Computing Surveys, vol. 53, No. 5, Article 96, Sep. 2020, pp. 1-41.

International Search Report and Written Opinion of the International Searching Authority issued in corresponding International Application No. PCT/EP2023/051921, mailed Mar. 22, 2023 (12 pages).

* cited by examiner

Figure 3

QUANTUM KEY DISTRIBUTION NETWORK AND QUANTUM-SECURED COMMUNICATION NETWORK INCLUDING THE ABOVE

CROSS REFERENCE TO RELATED APPLICATIONS

This application is a U.S. National Stage under 35 U.S.C. § 371 of PCT/EP2023/051921 filed Jan. 26, 2023, which depends from and claims priority to European patent application number 22154719.3 filed Feb. 2, 2022, the entire contents of which are incorporated herein by reference.

TECHNICAL FIELD

The present invention relates to the field of Quantum Key Distribution Networks and more particularly to a method and a system for improving the security of Quantum Key Distribution Networks.

BACKGROUND OF THE ART

This invention provides a method for improving the security of Quantum Key Distribution Networks (QKDNs). Quantum Key Distribution (QKD) is widely known for performing secure distribution of secret keys between distant users. However, a QKD link is point-to-point, generally called Alice and Bob, and is restricted in distance, typically 100 kms in commercial systems today. In order to extend this distance and to perform key distribution over complex topologies, one generally uses QKDNs, which encompass several QKD links, joined together at so-called Trusted Nodes (TNs). Today, all the keys processed at a TN appear in the open in the node. Therefore, the node must be well protected and trusted by all the users of the QKDN.

To generate an end-to-end key for distant nodes, there is a need for a key management layer (KML). In the standard method, all the QKD-Keys are stored in this layer. The end-to-end keys are calculated from these keys in the KML. They are then sent to the User Network, which consists of a separate upper layer, known as the Service Layer (SL) or Application Layer (AL). The KML, which has to connect to all the nodes, is the most exposed layer. In conclusion, a hacker could try to penetrate the KML and attempt to obtain the QKD-Keys.

There is therefore a need for a more secure QKDN which would permit to exchange end-to-end keys without risking of getting hacked by having it KML penetrated.

In most of the literature, as shown in FIGS. 1 to 3, there is a separation between the QKDN, which generates and distributes the keys, and the User Network, which comprises the various key users, which uses the keys provided by the QKDN. We will refer to the complete network comprising both the QKDN and the User Network as the Quantum-Secure Communication Network. Note however that the term QKDN is sometimes adopted in the literature to cover the complete network (See for example a recent review article on QKDN, named "Quantum Key Distribution: A Networking Perspective", ACM Computing Surveys, Volume 53, Issue 5 September 2021, Article No.: 96, pp 1-41, which describes explicitly the hierarchy of the three different layers.

As mentioned above, nowadays all QKDNs are based on Trusted Nodes (TNs). A TN contains two or more QKD systems. It is used to combine the keys generated by the QKD systems, thus providing the ability to have long-distance key exchange and complex topologies. The keys directly generated by the QKD devices will be called the QKD-keys. These QKD-keys are combined in different way to generate other keys, which will be used by the users. In particular, two QKD-keys can be combined with a bit-by-bit addition, also known as an XOR operation, to generate what we call an XORed-key. From Shannon information theory, it is impossible to use an XORed-key to gain any knowledge on the two corresponding QKD-keys. QKD-keys represent the most valuable element in a QKDN and have to be managed with the highest possible security. In a TN however, the QKD-keys are stored in the KML and therefore openly available if the TN is not secured.

In order to be managed, the networks are logically split in at least three layers as shown in FIGS. 1-3: the QKDN comprises the Quantum Layer (QL), where QKD systems generate the QKD-keys, and the Key Management Layer (KML), which manages the keys. The User Network comprises a Service Layer (SL) or Application Layer (AL), where the keys are used by various appliances. In the literature, various other layers have been added, such as a QKDN control layer. In all existing architectures, the QKD-keys start from the QL, go through the KML where they are stored and combined to generate end-to-end keys. These keys are then sent to the SL to be used by the end-users.

Nowadays, the KML receives the QKD-keys from the QKD devices, stores them for later use, combine then to generate end-to-end keys and distributes them to the end-users. It also has to receive the commands from the end-users, which request keys for communication. This layer is therefore the most sensitive one and can be at risk from hackers. As QKDNs have to be designed to be resistant to the quantum computer, providing a way for the KML to be quantum-safe is a demanding task. In particular, it cannot rely on existing public-key infrastructure, which will be broken by the quantum computer.

In this regard, a primary object of the invention is to solve the above-mentioned problems and more particularly to provide a QKDN architecture where the KML does not contain any secret key.

SUMMARY OF THE INVENTION

The above problems are solved by the present invention which is a new architecture of the QKDN to ensure that the KML contains no QKD-Keys. In principle, thanks to the present invention, the KML could be totally open. In practice, to improve security, one can add some level of protection, with standard cryptographic means. This invention therefore simplifies the architecture of QKDNs and improves the security.

The invention provides a method to combine the QKD-keys prior to their sending to the KML and ensures that the KML does not contain any secret key. Basically, a hacker, who has succeeded in penetrating the KML (either by breaking the underlying cryptography, or by different means such as obtaining a password illegally or by social engineering) will not be able to access the QKD-keys. The method simplifies the management of the secret keys and increases the security of QKDNs.

A first aspect of the invention therefore relates to a Quantum Key Distribution Network comprising a Quantum Key Distribution layer comprising a plurality of pairs of emitters and receivers and a plurality of Core Nodes and Edge Nodes and a Key Management Layer adapted to exclusively receive XORed-keys from the Core Nodes and send said XORed-keys and their combinations to the Edge Nodes of the QKD layer.

Preferably, the Key Management Layer does not contain or store any QKD-key.

According to a preferred embodiment of the present invention, the Quantum Key Distribution Network comprises at least one extra layer of security in the Key Management Layer comprising standard asymmetric cryptography such as RSA, ECC or Post Quantum Cryptography (PQC).

Advantageously, the link between the Edge Nodes and the Key User Layer is local and in a protected area.

Preferably, the Core Nodes contain at least two QKD devices and are configured to store QKD-keys temporarily, compute XORs of the QKD-keys and forward the XORed-keys to the KML.

Advantageously, the Core Nodes destroy the corresponding QKD-Keys after computing XORs of the QKD-keys.

According to a preferred embodiment of the present invention, the Edge Nodes contain at most one QKD device and are configured to receive XORed-keys from the KML, perform another XOR with its own corresponding QKD-key to get a final QKD-key and forward it to the SL.

A second aspect of the invention is a Quantum-Secure Communication Network comprising the Quantum Key Distribution Network of the first aspect and a Service Layer configured to receive keys from the Edge Nodes of the Quantum Key Distribution layer.

Advantageously, the link between Edge Nodes and their Service Layer is local and does not leave a protected area.

A third aspect of the invention is Quantum Key Distribution method carried out in a Quantum-Secure Communication Network of the second aspect, characterized in that it comprises the steps of generating QKD-Keys between two nodes in a QKD layer, wherein at least one of the nodes is a Core Node, and storing said QKD-Keys in both nodes, XORing said QKD-Keys into an XORed-key in the Core Node and preferably erasing the corresponding QKD-keys in the core node, sending said XORed-key to the KML for storage and mixing said XORed-keys so as to generate a mixed XORed-key and which in turns sends said mixed XORed-key to an Edge Node, performing another XOR in said Edge Node with its own corresponding QKD-key to get a final QKD-key.

BRIEF DESCRIPTION OF THE DRAWINGS

Further particular advantages and features of the invention will become more apparent from the following non-limitative description of at least one embodiment of the invention which will refer to the accompanying drawings, wherein

Figure 3:
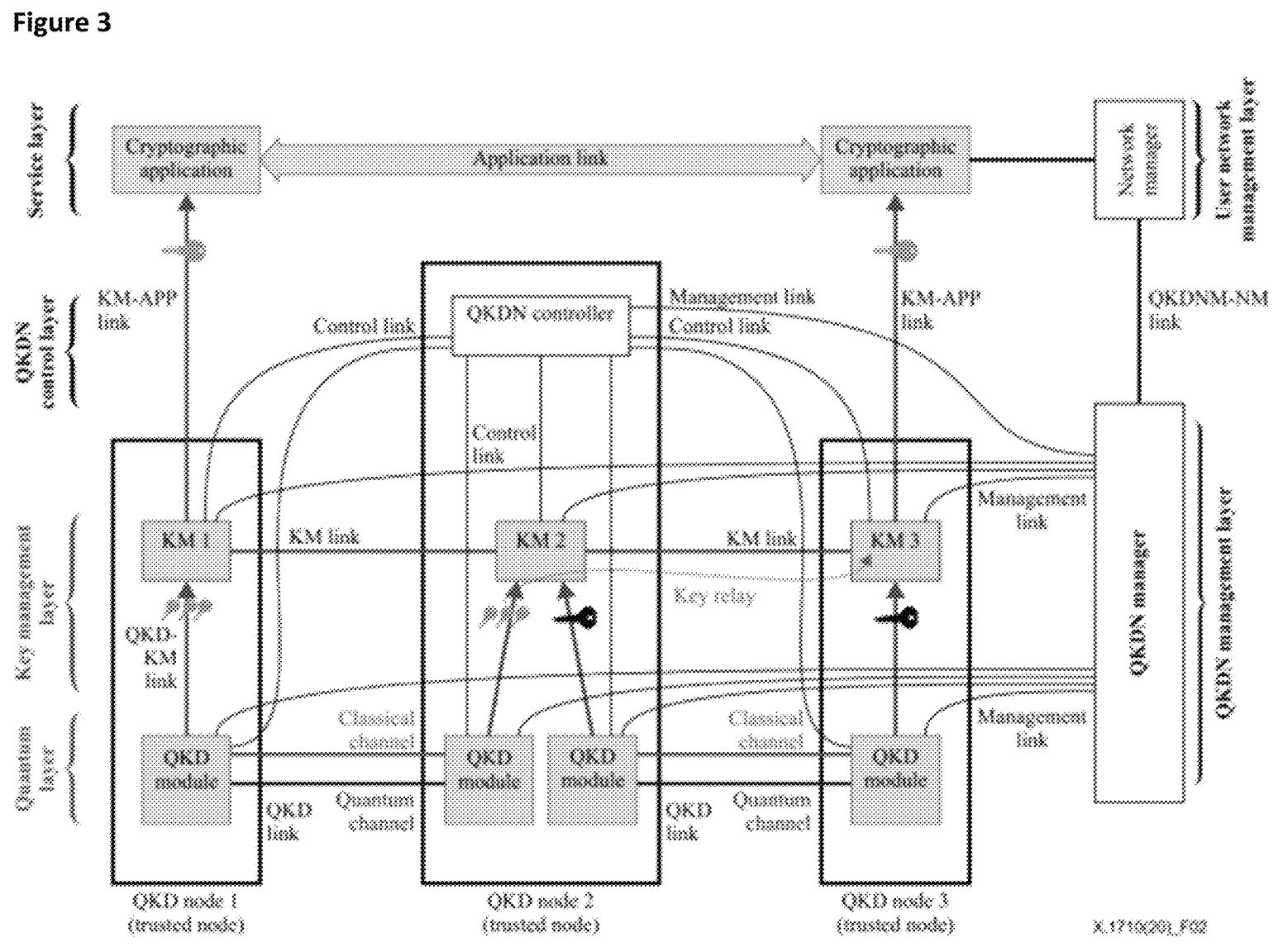

FIG. 3 is a conventional structure of a QKDN and User Network;

DETAILED DESCRIPTION OF THE INVENTION

Figure 1:
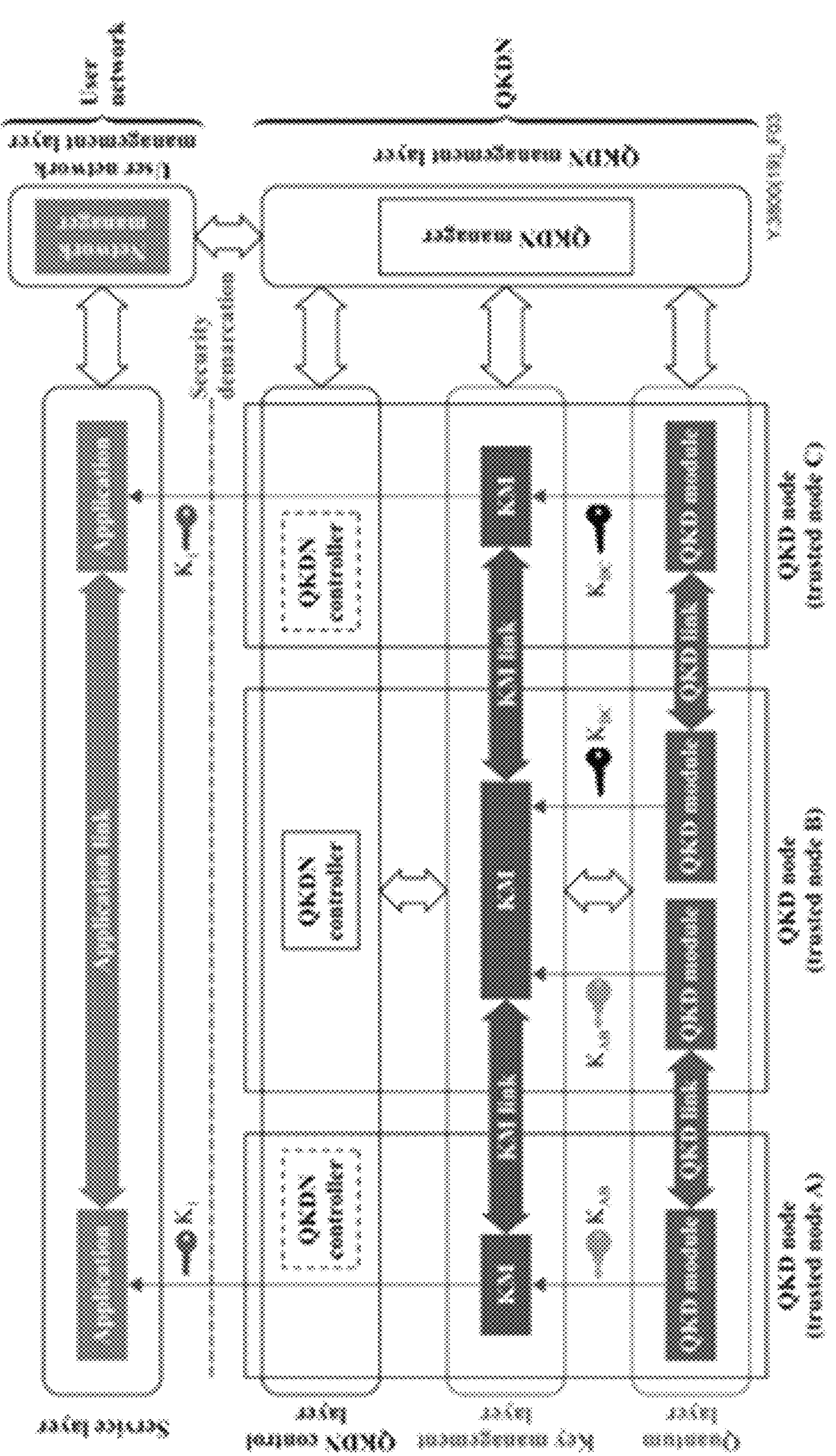
FIG. 1 is a schematic illustration of the conceptual structures of a conventional QKDN and a User Network.
Figure 2:
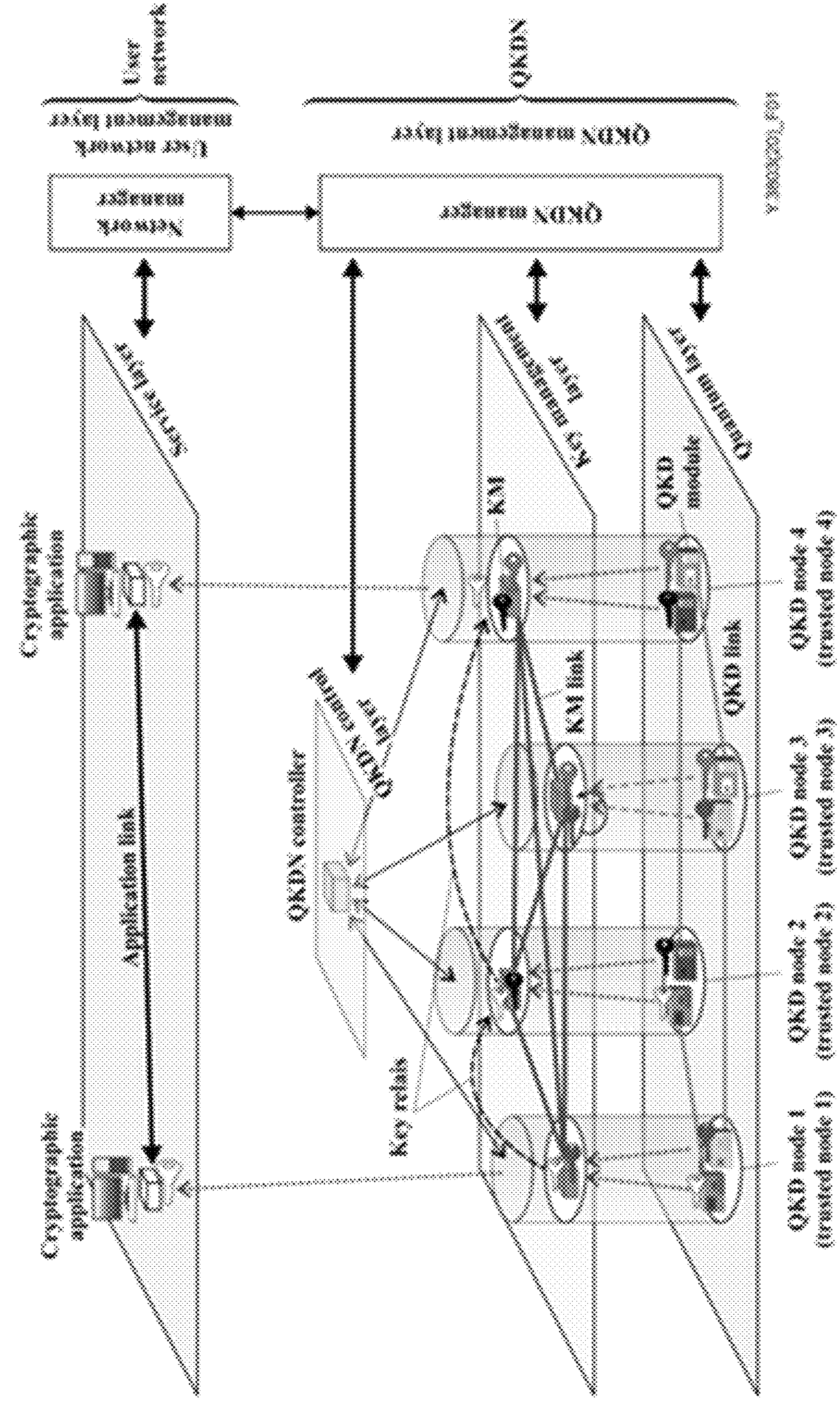
FIG. 2 represents conventional key management operations in a QKDN and a User Network.

The present detailed description is intended to illustrate the invention in a non-limitative manner since any feature of an embodiment may be combined with any other feature of a different embodiment in an advantageous manner.

FIG. 7 is a schematic illustration of the conceptual structures of a QKDN and a user network. It presents the different layers of a QKDN and their relationships, as recommended by the International Telecommunication Union. The keys are generated in the QL by the QKD modules and forwarded to the KML. They are combined in the KML to provide an end-to-end final key, which is forwarded to the SL, in the User Network. In this topology, there is one extra layer, the QKDN Control Layer, which contains one QKD controller at each node. In addition, a QKDN manager and a User Network manager are responsible for the operation of the network.

FIG. 8 represents conventional key management operations in a QKDN. It describes the three main layers and illustrates how a key is stored in the KML and hops from Node 1 to Nodes 4, thus generating an end-to-end key between Node 1 and Node 4.

FIG. 9 is a conventional structure of a QKDN and user network. It describes the structure of the QKDN and especially the control links, which connect the various elements. The Key Management (KM) modules, which store and combine the keys are structured within the TNs, but also in the KML. The links to the outside world may open attack surfaces.

FIG. 10 schematically represents an architecture of the QKDN and the User Network, according to a preferred embodiment of the present invention. In this architecture, the QKDN comprises two layers:

- the QKD layer, which contains all the QKD devices. The QKD layer is split into two kinds of nodes: the Core Nodes, which contain several QKD devices and distribute XORed-keys to the KML, and the Edge Nodes, which contain at most one QKD device, receive XORed-keys from the KML and provide final keys to the SL in the User Network, and
- The KML, which receives XORed-keys from the Core Nodes of the QKD layer, mixes these XORed-keys as requested by two Edge Nodes preferably by requesting to build an end-to-end secure key between them, and sends these mixed XORed-keys to these Edge Nodes. In the invention, the KML is characterized by the fact that it does not contain or store any QKD-key.

In addition, the User Network, which contains the SL, receives keys from the Edge Nodes of the QKD layer in order to use it for various applications. The link between Edge Nodes and their Key User is local and does not leave a protected area.

The architecture of the QKDN according to a preferred embodiment of the present invention contains two main features:

The first feature of the invention is that the KML is configured so as not to contain any QKD-key. This significantly lowers the security requirements on the KML. This is obtained by the fact that the QKD layer is configured to only send XORed-key to the KML. These XORed-keys are stored and managed in the KML. They will be used upon request from two users to manufacture a common secret end-key.

The second feature is that the TNs in the QKD layer are separated into two types of nodes: the Core Nodes, and the Edge Nodes.

FIG. 11 illustrates the Core nodes and the Edge Nodes organizations and concept. The Core Nodes contain at least two QKD device. They are used to combine QKD-keys into XORed-keys and transfer them to the KML. They are only connected to the KML above, but not to the SL below.

More particularly, their role is to store QKD-keys temporarily, compute XORs of the QKD-keys as soon as they are available, forward the XORed-keys to the KML, and destroy the corresponding QKD-Keys. They must be designed to only allow the transfer of XORed-keys to the KML. This can be obtained for example by restricting the command set that the Core Node can understand. Preferably, the system should be designed in such a way that the KML should not be able to request a QKD-key from the Core Nodes at all. The Core Nodes will store the QKD-keys from the QKD devices temporarily, perform the XOR between two QKD-keys coming from two QKD devices, send the XORed-key to the KML, and destroy the corresponding QKD-keys. All the key management and storage will then be done on the XORed-keys, within the KML.

The Edge Nodes contain at most one QKD device. Preferably, the Edge Nodes are linked to a single Core Node. If an Edge Node is outside of the local protected area of the corresponding Core Node, it is linked to it by a QKD device. The keys exchanged between the Edge Node and the Core Node are secure QKD-Keys. If the Edge Node is contained within the local protected area, the key exchange can be done by simpler means. For example, the Edge Node can generate a key with a Quantum Random Number Generator (QRNG) and forward it to the Core Node with a standard communication link.

The Edge Nodes need to store their QKD-keys until usage is requested, for this reason they must have a secure storage facility. They receive XORed-keys from the KML, performs another XOR with their own corresponding QKD-key to get a final QKD-key, which will be sent to the Application Layer. Note that the device using the keys has to be in the same physically protected area as the Edge Node. Some algorithmic protection can be added to the nodes.

FIG. 12 shows a QKD layer according to the present invention. More particularly, the QKD layer is represented with an example of node numbering (Edge Nodes are lettered, Core Nodes are numbered) and the corresponding QKD-keys. The key exchange between A and B is explained in the below.

Figure 4:
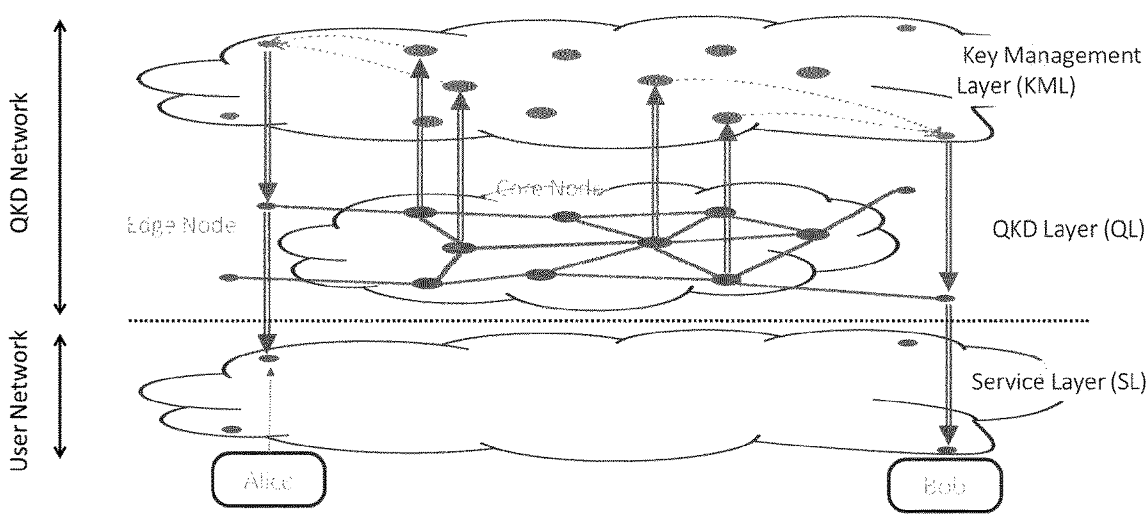
FIG. 4 schematically represents an architecture of the QKDN and the User Network according to a preferred embodiment of the present invention.
Figure 5:
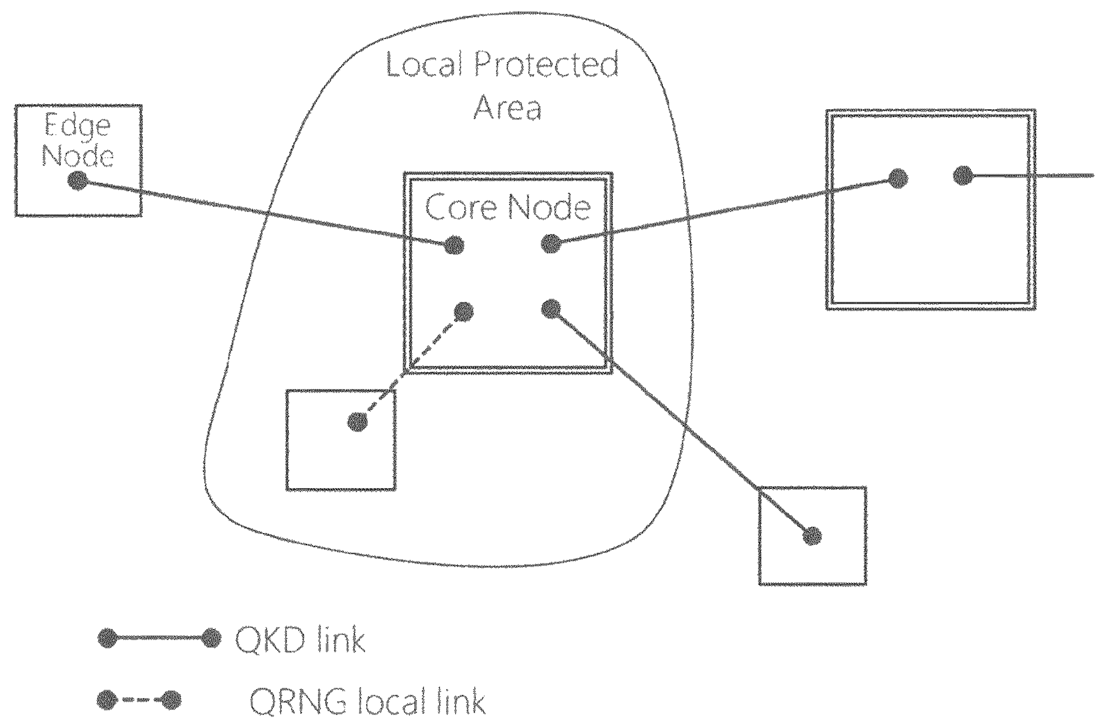
FIG. 5 illustrates Core nodes and Edge Nodes organizations and concept.
Figure 6:
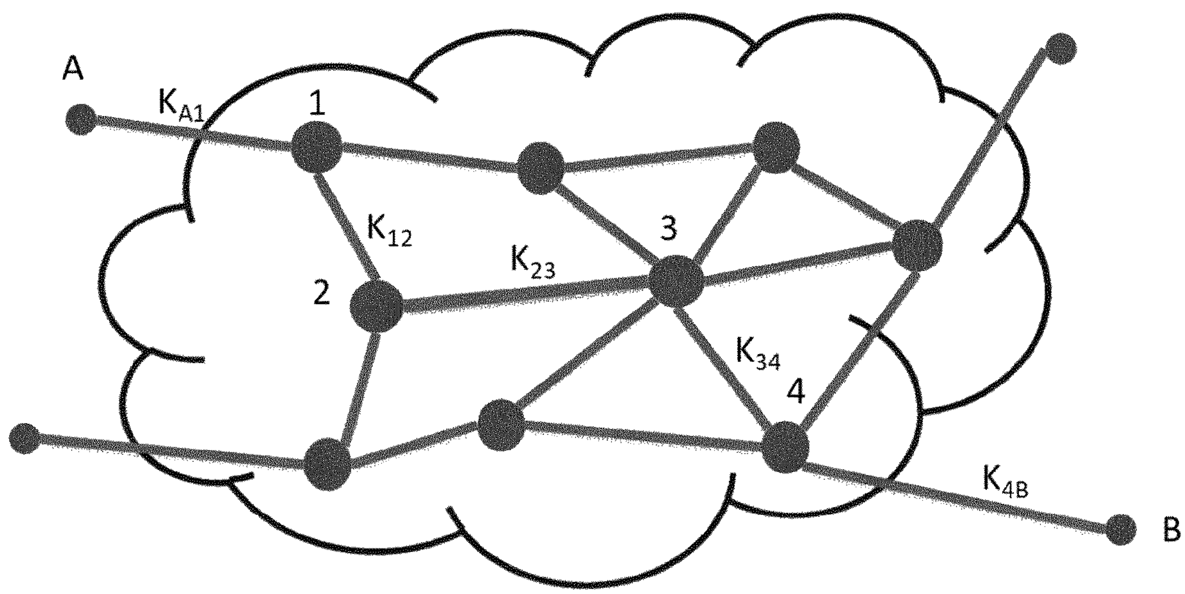
FIG. 6 shows a QKD layer according to the present invention.

The QKD layer constantly generates QKD-keys between the various nodes. The keys between Core Nodes and Edge Nodes (e.g. $K_{A1}$) are stored on both sides, in the Edge Node until they are used, and temporarily in the Core node. The keys between the Core Nodes (e.g. $K_{12}$) are temporarily stored in both of the nodes. For Core Nodes, as soon as two QKD-keys are available, say $K_{12}$ and $K_{23}$, the node performs an XOR to calculate the XORed-key: $K_{123} \cong K_{12} \oplus K_{23}$ and sends the result to the KML in this case above Node 2 for storage. The KML stores all the XORed-keys for the Core Nodes, ready to use upon request. When two end users, say, A and B need a shared key, they inform the KML. The KML retrieves the stored XORed-keys from the various Core Nodes, processes then and sends the processed XORed-keys to the Edge Nodes. For example, as shown in FIG. 4 and FIG. 4 schematically represents an architecture of the QKDN and the User Network according to a preferred embodiment of the present invention;

FIG. 5 illustrates Core nodes and Edge Nodes organizations and concept;

FIG. 6, we have:

In Node 1: $K_{A12} \cong K_{A1} \oplus K_{12}$

In Node 2: $K_{123} \cong K_{12} \oplus K_{23}$

The KML calculates a new mixed XORed-key: $K_{A12} \oplus K_{123} = K_{A1} \oplus K_{23}$ (the XOR of two identical keys gives 1) and forwards it to Node A. Since Node A has stored $K_{A1}$ and has received $K_{A1} \oplus K_{23}$ from the KML, it obtains $K_{23}$.

Similarly, the XORed-key in Node 3 is: $K_{234} \cong K_{23} \oplus K_{34}$

And in Node 4: $K_{34B} \cong K_{34} \oplus K_{4B}$

The KML calculates the new mixed XORed-key: $K_{234} \oplus K_{34B} = K_{23} \oplus K_{4B}$ and forwards it to Node B. Since Node B has stored $K_{4B}$ it also obtains $K_{23}$.

Node A and Node B now share the same QKD-keys. These keys are finally sent to the SL below for utilization.

Note that the KML can decide, how to mix the XORed-keys and to whom to send the mixed keys. For example, he could mix all the keys and send them all to Node B. In this case, Node A and Node B would share $K_{A1}$. The KML can also send the XORed-keys to the relevant Edge Nodes and let the Edge Nodes do the mixing. This extra degree of freedom can add some security to the scheme.

A key point here is that the KML only has the XORed-keys, but never a QKD-key. The final processing can only be done by the Edge Nodes, locally. The KML acts as a broker, who can deliver the XORed-keys to the Edge Nodes but cannot discover the QKD-keys. If the KML is hacked or becomes a bad actor, he can prevent A and B to create the keys, but he cannot make them believe that they have a secret key. The QKDN can only be broken by joint actions of the KML and the Core Nodes of the TNs, who might keep the QKD-keys. However, since the Core Nodes are designed not to store any QKD-key for long, they would have to be physically tampered with to do so. By adding a suitable delay, much longer than the maximum time the QKD-keys can be stored at the Core Nodes, between the generation of the keys and their use by the KML, one can ensure that the QKD-keys have all been erased before the corresponding XORed-keys are used in the exchange. A bad actor would also need to keep count of all the keys, and to know when they are going to be used. Note that, if an Edge Node is tampered with, it is trivial that no secret key can be kept there. But this only applies to this particular node.

In principle, all the XORed-keys could be exchanged publicly. In practice, it will be advantageous to use an encryption scheme, to add an extra layer of security. Today, one can use standard asymmetric cryptography (for example RSA or ECC). Tomorrow one could upgrade to the new Post Quantum Cryptography (PQC), which is under standardization at NIST. By using PQC for the KML and QKD in the QKD layer, we obtain a stronger system.

While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the scope of this disclosure. This for example particularly the case regarding the different apparatuses which can be used.

The invention claimed is:

1. A Quantum Key Distribution Network system, comprising:

a Quantum Key Distribution (QKD) Layer comprising a plurality of pairs of emitters and receivers and a plurality of Nodes, and a Key Management Layer (KML), wherein the plurality of nodes of the QKD Layer comprises:

Core Nodes adapted to receive QKD-keys, compute XORs of said QKD-keys to generate XORed-keys, and exclusively send said XORed-keys to the KML, and Edge Nodes adapted to receive said XORed-keys from the KML, perform another XOR with a corresponding QKD-key to obtain a final QKD-key and send said QKD-key to a Service Layer, and wherein the KML is adapted to exclusively receive XORed-keys from the Core Nodes, mix said XORed-keys as requested by two Edge Nodes, and send said mixed XORed-keys to the two Edge Nodes of the QKD Layer.

2. The Quantum Key Distribution Network system according to claim 1, characterized in that the Key Management Layer does not contain or store any QKD-key.

3. The Quantum Key Distribution Network system according to claim 1, further comprising at least one extra layer of security in the Key Management Layer comprising standard asymmetric cryptography.

4. The Quantum Key Distribution Network system according to claim 1, characterized in that a link between the Edge Nodes and the Key Service Layer (SL) is local and in a protected area.

5. The Quantum Key Distribution Network system according to claim 1, characterized in that the Core Nodes contain at least two QKD devices and are configured to store QKD-keys temporarily.

6. The Quantum Key Distribution Network system according to claim 1, characterized in that the Core Nodes destroy corresponding QKD-Keys after computing XORs of the QKD-keys.

7. The Quantum Key Distribution Network system according to claim 1, characterized in that the Edge Nodes contain at most one QKD device.

8. A Quantum-Secure Communication Network system comprising the Quantum Key Distribution Network system of claim 1 and the Service Layer configured to receive QKD-keys from the Edge Nodes of the QKD Layer.

9. The Quantum-Secure Communication Network system according to claim 8, wherein a link between Edge Nodes and their Service Layer is local and does not leave a protected area.

10. A Quantum Key Distribution method carried out in a Quantum-Secure Communication Network system of claim 8, characterized in that it comprises the steps of:

generating pairs of QKD-Keys between several nodes in the QKD Layer, wherein at least two of the nodes are Edge Nodes and at least one of the nodes is a Core Node;

storing said QKD-Keys in the Edge Nodes;

XORing said QKD-Keys into XORed-keys in the Core Node;

sending said XORed-keys to the KML for storage;

mixing said XORed-keys upon request of the Edge Nodes so as to generate mixed XORed-keys, and sending said mixed XORed-keys to two Edge Nodes; and performing another XOR in said Edge Nodes with their own corresponding QKD-keys to get a final shared QKD-key between the two Edge Nodes.

11. The Quantum Key Distribution Network system according to claim 2, further comprising at least one extra layer of security in the Key Management Layer comprising standard asymmetric cryptography.

12. The Quantum Key Distribution Network system according to claim 2, characterized in that a link between the Edge Nodes and the Service Layer is local and in a protected area.

13. The Quantum Key Distribution Network system according to claim 3, characterized in that a link between the Edge Nodes and the Service Layer is local and in a protected area.

14. The Quantum Key Distribution Network system according to claim 2, characterized in that the Core Nodes contain at least two QKD devices and are configured to store QKD-keys temporarily, compute XORs of the QKD-keys and forward the XORed-keys to the KML.

15. The Quantum Key Distribution Network system according to claim 3, characterized in that the Core Nodes contain at least two QKD devices and are configured to store QKD-keys temporarily, compute XORs of the QKD-keys and forward the XORed-keys to the KML.

16. The Quantum Key Distribution Network system according to claim 4, characterized in that the Core Nodes contain at least two QKD devices and are configured to store QKD-keys temporarily, compute XORs of the QKD-keys and forward the XORed-keys to the KML.

17. The Quantum Key Distribution Network system according to claim 2, characterized in that the Core Nodes destroy corresponding QKD-Keys after computing XORs of the QKD-keys.

18. The Quantum Key Distribution Network system according to claim 3, characterized in that the Core Nodes destroy corresponding QKD-Keys after computing XORs of the QKD-keys.

19. The Quantum Key Distribution Network system according to claim 2, characterized in that the Edge Nodes contain at most one QKD device and are configured to receive XORed-keys from the KML, perform another XOR with their own corresponding QKD-key to get a final QKD-key and forward it to the Service Layer.

20. The Quantum Key Distribution Network system according to claim 3, characterized in that the Edge Nodes contain at most one QKD device and are configured to receive XORed-keys from the KML, perform another XOR with their own corresponding QKD-key to get a final QKD-key and forward it to the Service Layer.

* * * * *